United States Patent
Hwang (10) Patent No.: US 11,338,681 B2
(45) Date of Patent: May 24, 2022

(54) VEHICLE AND INFORMATION OUTPUT METHOD THEREFOR

(71) Applicants: Hyundai Motor Company, Seoul (KR); Kia Motors Corporation, Seoul (KR)

(72) Inventor: Jun Sik Hwang, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 33 days.

(21) Appl. No.: 17/119,358

(22) Filed: Dec. 11, 2020

(65) Prior Publication Data

US 2021/0379994 A1 Dec. 9, 2021

(30) Foreign Application Priority Data

Jun. 9, 2020 (KR) ........................ 10-2020-0069686

(51) Int. Cl.
*B60K 35/00* (2006.01)

(52) U.S. Cl.
CPC .......... *B60K 35/00* (2013.01); *B60K 2370/11* (2019.05); *B60K 2370/154* (2019.05); *B60K 2370/162* (2019.05); *B60K 2370/171* (2019.05); *B60K 2370/172* (2019.05)

(58) Field of Classification Search
None
See application file for complete search history.

(56) References Cited

U.S. PATENT DOCUMENTS

| | | | | |
|---|---|---|---|---|
| 8,332,093 B2 * | 12/2012 | Yamasaki | ............... | G06F 3/017 340/425.5 |
| 9,366,216 B2 * | 6/2016 | Be | ........................ | F02N 11/0818 |
| 9,672,637 B2 * | 6/2017 | Sogo | ..................... | G06F 3/1423 |
| 9,959,838 B2 * | 5/2018 | Nagata | ................. | G06F 3/1423 |
| 10,569,654 B2 * | 2/2020 | Tokairin | ............. | G06F 3/04847 |
| 2010/0102945 A1 * | 4/2010 | Watson | ................... | B60L 50/16 340/462 |
| 2010/0219947 A1 * | 9/2010 | Kataoka | ................. | B60K 35/00 340/461 |
| 2013/0282226 A1 * | 10/2013 | Pollmann | ............... | B60K 35/00 701/29.1 |
| 2015/0127210 A1 * | 5/2015 | Suzuki | ............... | G01C 21/3688 701/29.1 |
| 2020/0331321 A1 * | 10/2020 | Yamashita | ......... | B60H 1/00778 |

FOREIGN PATENT DOCUMENTS

EP 0999087 A2 * 5/2000 ............. B60K 35/00

* cited by examiner

*Primary Examiner* — Chico A Foxx
(74) *Attorney, Agent, or Firm* — Slater Matsil, LLP (57) ABSTRACT

An information output method includes determining, when a first condition is satisfied, whether a second or a third condition related to a pop-up in a first form from a time point of ignition off is satisfied, and setting at least one first pop-up request corresponding to the pop-up in the first form to a second pop-up request corresponding to a pop-up in a second form output during ignition on when the second condition or the third condition is satisfied, wherein whether the second condition is satisfied is determined in consideration of a number of first pop-up requests expected at the time point of ignition off, and whether the third condition is satisfied is determined in consideration of the number of first pop-up requests which are not displayed as pop-ups in the first form after ignition off from previously generated first pop-up requests.

19 Claims, 5 Drawing Sheets

VEHICLE AND INFORMATION OUTPUT METHOD THEREFOR

CROSS-REFERENCE TO RELATED APPLICATIONS

This application claims the benefit of Korean Patent Application No. 10-2020-0069686, filed on Jun. 9, 2020, which application is hereby incorporated herein by reference.

TECHNICAL FIELD

The present invention relates to a vehicle and an information output method therefor.

BACKGROUND

Recently, the number of electronic apparatuses mounted in a vehicle has increased and the number of convenience functions implemented through the electronic apparatuses has also increased. Accordingly, the amount of information that needs to be provided to a passenger has also increased.

Some of such information can be output through a display provided in a dashboard.

Figure 1A:
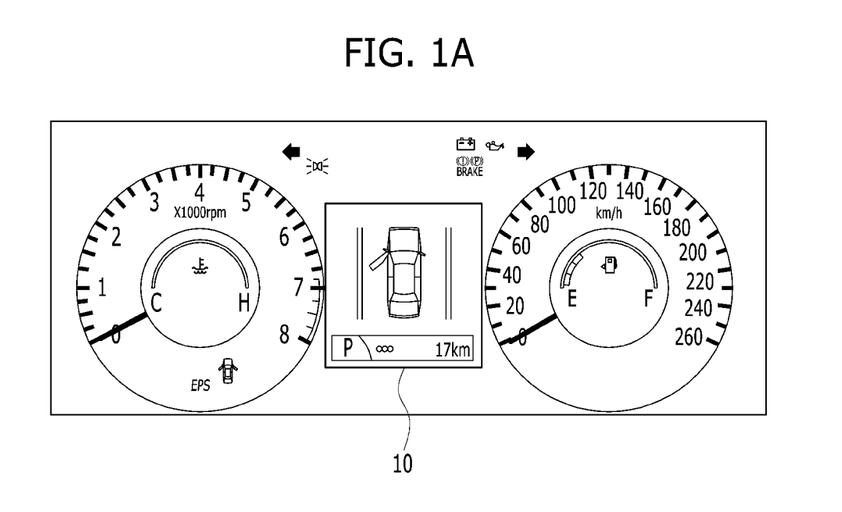
FIGS. 1A and 1B are diagrams for describing cluster configurations including displays.
Figure 1B:
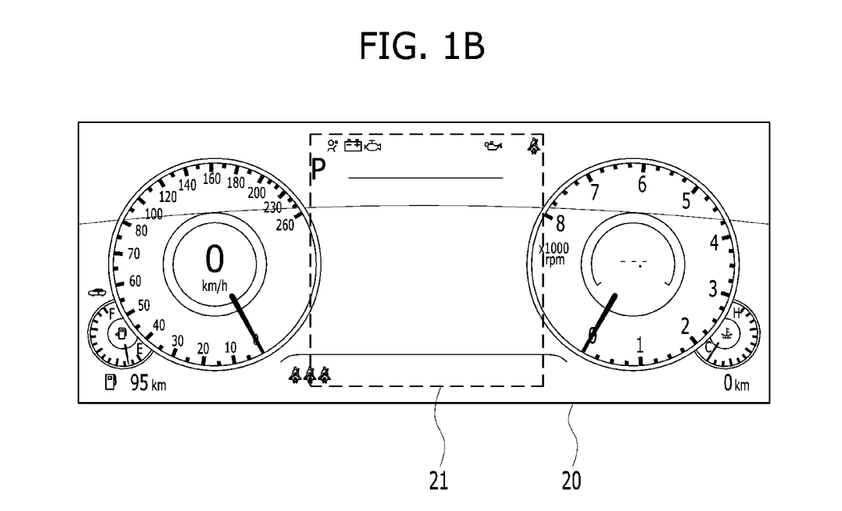
Figure 2A:
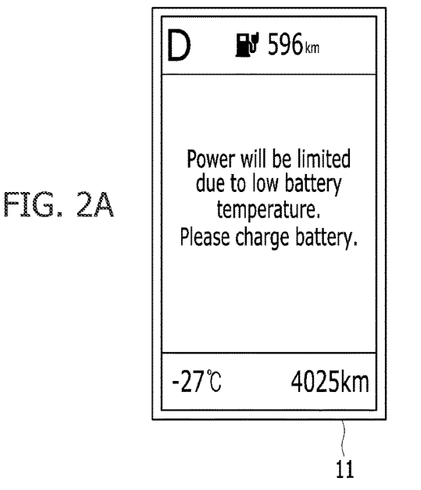
FIGS. 2A-2D show examples of pop-up forms output when an ignition is turned off.
Figure 2B:
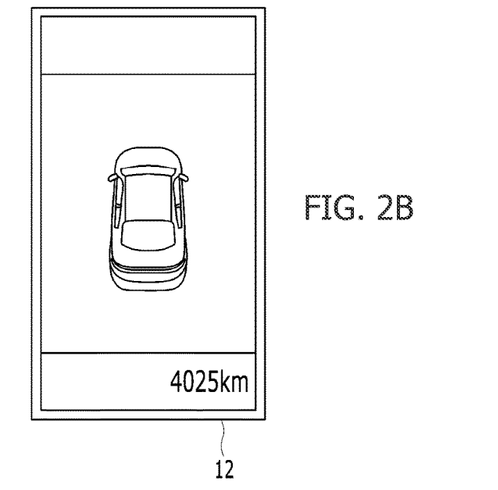
Figure 2C:
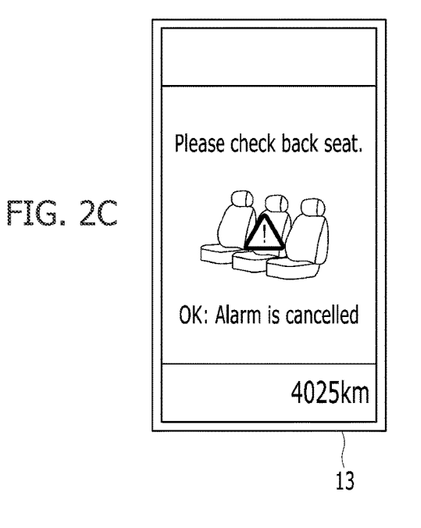
Figure 2D:
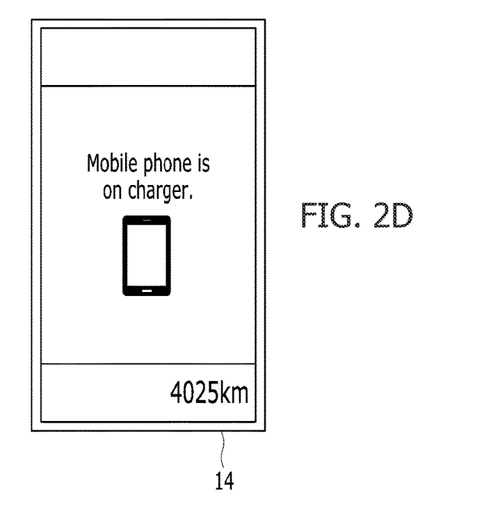

FIGS. 1A and 1B are diagrams for describing cluster configurations including displays.

First, referring to FIG. 1A, an RPM gauge on the left and a speed gauge on the right are of an analog type, and a display 10 is disposed at the center of the cluster to provide various types of information using images.

Referring to FIG. 1B, a cluster 20 configured as a display, that is, a full LCD type cluster, is illustrated. Although this type of cluster can display various images as compared to the cluster of FIG. 1A, information other than information related to original functions of the cluster, such as an RPM gauge and a speed gauge, is still output through an area 21 at the center of the cluster in general.

Information corresponding to various situations can be displayed as pop-up images in clusters including the aforementioned displays, and pop-up information can be divided into information output at a point in time of transition from an ignition on state to an ignition off state and information output while a cluster is activated at other times.

Information output in the form of a pop-up at a point in time of transition from an ignition on state to an ignition off state, that is, a point in time at which the ignition is turned off (or when the ignition is turned off and the driver's door is opened) may be referred to as an "IG off pop-up" which includes information that needs to be provided to a driver when alighting from the vehicle.

FIGS. 2A-2D show examples of pop-ups output at a point in time at which the ignition is turned off.

Referring to FIGS. 2A-2D, an ignition (IG) off pop-up may include a battery alarm 11 output from an eco-friendly vehicle including a driving motor and a main battery for providing power to the driving motor (FIG. 2A), a sunroof opening alarm 12 (FIG. 2B), an alarm 13 for an object on the back seat (FIG. 2C), an alarm 14 for a mobile phone in a wireless charger (FIG. 2D), and the like.

A request for output of a pop-up is transmitted from a controller or a sensor while the ignition is turned on, and a cluster controller generally controls pop-up output for a request for output of an IG off pop-up such that a pop-up is output for a request that is still valid from among output requests that have been generated upon turning off of the ignition instead of generation of the request for output of the IG off pop-up.

However, the number of the aforementioned IG off pop-ups naturally increases as the number of functions provided in a vehicle increases. Accordingly, a large number of pop-ups need to be output for a limited time in which a driver alights the vehicle. However, when the driver turns off the ignition and then rapidly opens the driver's door, there may be pop-ups that have not been output because the cluster is turned off when the driver's door is opened. Further, when an output time of an individual pop-up is decreased since there are many pop-ups, a changed output time of an individual pop-up may be insufficient to be recognized by the driver, which becomes a problem.

SUMMARY

The present invention relates to a vehicle and an information output method therefor. Particular embodiments relate to a vehicle and an information output method therefor which can effectively control information output when an ignition is turned off.

An embodiment of the present invention provides a vehicle and an information output method therefor which can effectively display a pop-up to be output when an ignition is turned off.

In particular, embodiments of the present invention provide a vehicle and an information output method therefor which can prevent a pop-up to be output from being omitted when the ignition is turned off.

It will be appreciated by persons skilled in the art that the objects that could be achieved with embodiments of the present invention are not limited to what has been particularly described hereinabove and the above and other objects that embodiments of the present invention could achieve will be more clearly understood from the following detailed description.

An information output method according to an embodiment of the present invention includes determining whether at least one of a second condition and a third condition related to a pop-up in a first form displayed through a vehicle display from a point in time of ignition off is satisfied when a predetermined first condition is satisfied, and setting at least one of a plurality of first pop-up requests corresponding to the pop-up in the first form to a second pop-up request corresponding to a pop-up in a second form output during ignition on when the second condition or the third condition is satisfied according to a result of the determination, wherein whether the second condition is satisfied is determined in consideration of the number of first pop-up requests expected at the time of ignition off, and whether the third condition is satisfied is determined in consideration of the number of first pop-up requests for each type which are not displayed as pop-ups in the first form after ignition off from among previously generated first pop-up requests for each type.

In another aspect of the present invention, an information output apparatus for a vehicle according to an embodiment of the present invention includes a display for displaying a pop-up in a first form from a point in time of ignition off, and a controller for controlling the display, wherein the controller includes a parking determination unit for determining whether a predetermined first condition is satisfied, and a condition determination unit for determining whether at least one of a second condition and a third condition related to the pop-up in the first form is satisfied when the parking determination unit determines that the first condition is satisfied and setting at least one of a plurality of first pop-up requests corresponding to the pop-up in the first form to a second pop-up request corresponding to a pop-up in a second form output during ignition on when the second condition or the third condition is satisfied, wherein whether the second condition is satisfied is determined in consideration of the number of first pop-up requests expected at the time of ignition off, and whether the third condition is satisfied is determined in consideration of the number of first pop-up requests for each type which are not displayed as pop-ups in the first form after ignition off from among previously generated first pop-up requests for each type.

A vehicle according to at least one embodiment of the present invention configured as above can more effectively display a pop-up to be output when the ignition is turned off.

In particular, according to embodiments of the present invention, it is possible to prevent omission of information that needs to be transmitted to a driver when the ignition is turned off by changing display time of at least some pop-ups on the basis of a display frequency and the amount of generation of pop-ups to be output when the ignition is turned off.

It will be appreciated by persons skilled in the art that the effects that can be achieved with embodiments of the present invention are not limited to what has been particularly described hereinabove and other advantages of embodiments of the present invention will be more clearly understood from the following detailed description.

DETAILED DESCRIPTION OF ILLUSTRATIVE EMBODIMENTS

The detailed description of exemplary embodiments of the present invention will be given to enable those skilled in the art to implement and practice the invention with reference to the attached drawings. However, the present invention can be implemented in various different forms and is not limited to embodiments described herein. In addition, parts that are not related to description will be omitted for clear description in the drawings, and the same reference numbers will be used throughout this specification to refer to the same or like parts.

Throughout the specification, when it is said that some part "includes" a specific element, this means that the part may further include other elements, not excluding the same, unless mentioned otherwise. In addition, the same or similar elements are designated by the same reference numerals throughout the specification.

An embodiment of the present invention proposes a method of preventing omission of information that needs to be transmitted to a driver when the ignition is turned off by changing display time of at least some pop-ups on the basis of a display frequency and the amount of generation of pop-ups to be output when the ignition is turned off.

Figure 3:
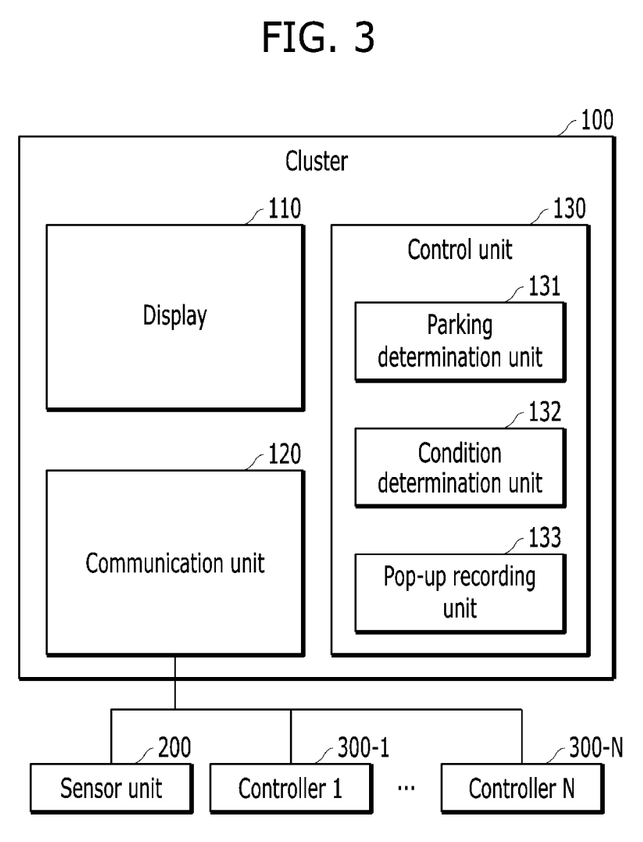
FIG. 3 is a block diagram showing an example of a vehicle structure according to an embodiment of the present invention.

FIG. 3 is a block diagram showing an example of a vehicle configuration according to an embodiment of the present invention.

Referring to FIG. 3, a vehicle according to an embodiment may include a cluster 100, a sensor unit 200, and a plurality of controllers 300-1 to 300-N.

The cluster 100 may include a display 11o, a communication unit 120, and a control unit 130.

The display 11o can visually display at least an IG off pop-up according to control of the control unit 130.

The communication unit 120 can exchange data with the sensor unit 200 and the controllers 300-1 to 300-N which are external components through a predetermined communication protocol. For example, communication protocols can include a controller area network (CAN), CAN flexible data rate (CAN-FDR), a local interconnect network (LIN), and Ethernet which are widely used for vehicle communication, without being limited thereto.

The control unit 130 can control display of an IG off pop-up through the display 110 on the basis of information received from the sensor unit 200 or the controllers 300-1 to 300-N through the communication unit 120. To this end, the control unit 130 may include a parking determination unit 131, a condition determination unit 132, and a pop-up recording unit 133. Specific functions of the components 131, 132 and 133 of the control unit 130 will be described in detail later.

The sensor unit 200 can output vehicle stat information and information for determining whether an IG off pop-up output condition is satisfied. To this end, the sensor unit 200 may include a vehicle speed sensor, a global positioning system (GPS), a vehicle door sensor, and the like, but these sensors are exemplary and the sensor unit 200 is not limited thereto.

The controllers 300-1 to 300-N can transmit a display request for an IG off pop-up and various types of vehicle state information to the cluster 100. For example, the controllers 300-1 to 300-N may include a head unit (or audio/video/navigation (AVN)) controller which provides information about whether a vehicle approaches/reaches a destination and information about whether the vehicle approaches/reaches a parking lot, a transmission controller which provides information about a current gear stage of a transmission, an engine controller which provides vehicle speed information, a body controller (body control module (BCM)) which provides state information of a door/window/sunroof/lighting, a wireless charging controller which provides information about presence or absence of a device on a charging pad, and the like but are not limited thereto.

Hereinafter, the control unit 130 will be described in more detail.

First, the parking determination unit 131 can determine whether parking determination conditions are satisfied in order to predict ignition off (IG off). Specifically, the parking determination unit 131 can acquire current position information, information about whether the vehicle approaches/reaches a destination and whether the vehicle approaches/reaches a parking lot, vehicle speed information, and gear stage information from the sensor unit 200, the head unit controller and the transmission controller and determine whether the parking determination conditions are satisfied. For example, the parking determination unit 131 can determine that the parking determination conditions are satisfied when the vehicle is currently positioned within a specific distance from a parking lot or a destination and a vehicle speed is less than a predetermined value (e.g., 5 kph). Further, the parking determination unit 131 can determine that the parking determination conditions are satisfied when the vehicle is currently positioned within a specific distance from a parking lot or a destination and a current gear stage has changed to park (P) stage.

The condition determination unit 132 can determine whether an overflow condition and a non-display condition are satisfied when the parking determination unit 131 determines that the parking determination conditions are satisfied. Here, the overflow condition can be satisfied when the number of IG off pop-ups predicted to be displayed exceeds a predetermined number and whether the non-display condition is satisfied can be determined according to the frequency of generation of IG off pop-ups which are display targets but have not been output until the cluster is turned off.

The condition determination unit 132 can perform pop-up setting control for changing an output time of at least one IG off pop-up according to whether the overflow condition or the non-display condition is satisfied.

The pop-up recording unit 133 can record a request for display of an IG off pop-up, the frequency of display request, and whether an IG off pop-up is actually displayed for each IG off pop-up type, process the records and provide the processed records to the condition determination unit 132.

Determination of whether each condition is satisfied and pop-up setting control in the condition determination unit 132 and data processing in the pop-up recording unit 133 will be described in detail with reference to FIGS. 4 and 5.

Meanwhile, the communication unit 120 and the control unit 130 may be implemented to configure a cluster controller according to an embodiment, but the present invention is not limited thereto.

Figure 4:
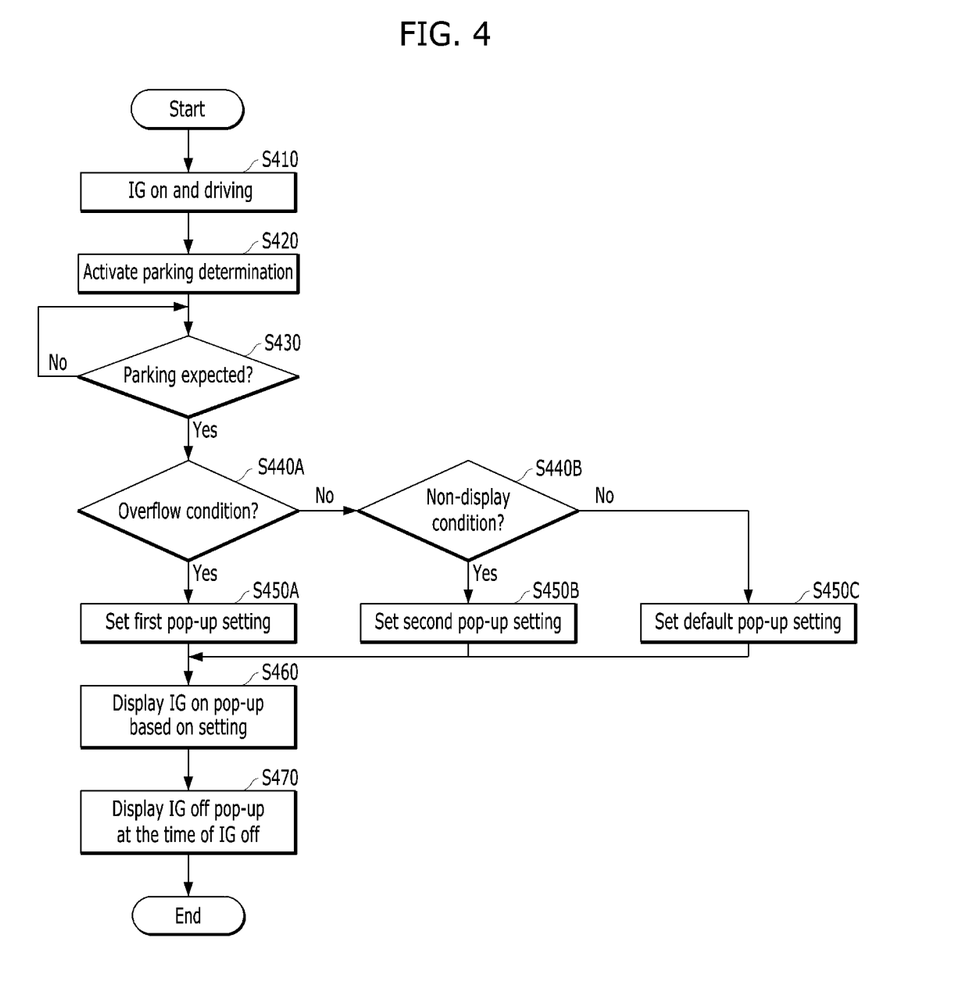
FIG. 4 is a flowchart showing an example of an information output control process according to an embodiment of the present invention.

FIG. 4 is a flowchart showing an example of an information output control process according to an embodiment of the present invention.

Referring to FIG. 4, when the ignition of a vehicle is turned on, the vehicle can start to travel (S410). When the vehicle starts to travel, determination of whether the parking determination conditions are satisfied can be performed in the parking determination unit 131 of the cluster 100 in order to determine a control time with respect to an IG off pop-up (S420).

When parking is expected (Yes in S430), that is, when the parking determination conditions are satisfied, the condition determination unit 132 of the control unit 130 can determine whether the current state corresponds to the overflow condition or the non-display condition on the basis of IG off pop-up requests generated until now from starting of the vehicle and information of the pop-up recording unit 133 (S440A and S440B).

The overflow condition can be satisfied when it is expected that more than a predetermined number of IG off pop-ups will be generated, and when the overflow condition is satisfied (Yes in S440A), first pop-up setting for changing display points in time of at least some pop-ups to points in time before actual IG off is applied to secure a time for which a driver checks information.

The step (S440A) of determining whether the overflow condition is satisfied will be described in more detail with reference to FIG. 5. FIG. 5 is a flowchart showing an example of a process of determining whether the overflow condition is satisfied according to an embodiment of the present invention.

Figure 5:
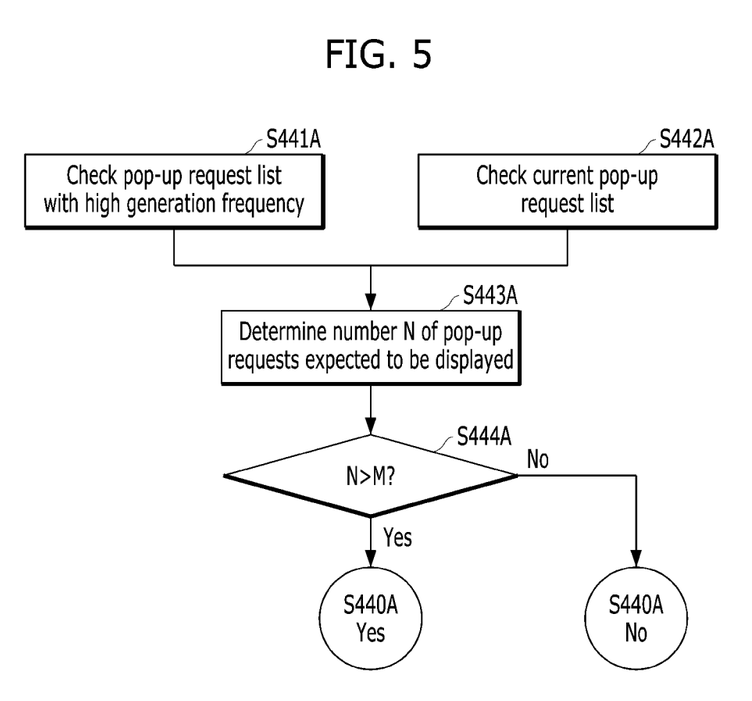
FIG. 5 is a flowchart showing an example of a process of determining whether an overflow condition is satisfied according to an embodiment of the present invention.

Referring to FIG. 5, the condition determination unit 132 can check a pop-up request list with high generation frequency in the pop-up recording unit 133 (S441A). For example, the pop-up recording unit 133 can store IG off pop-ups for which a display request is generated more than a specific frequency (e.g., 75%) with respect to a total number of travels as data.

In addition, the condition determination unit 132 checks a current pop-up request list (S442A). This is because, when a request generation condition for each pop-up is satisfied, a pop-up request is generated at the corresponding point in time even before actual IG off.

The condition determination unit 132 can check each pop-up request list and determine the number N of pop-ups expected to be displayed on the basis thereof (S443A). Here, the number N of pop-ups expected to be displayed can be determined by a method of excluding the number of redundant items from the sum of the number of items of a pop-up request list with high generation frequency and the number of items of the current pop-up request list.

The condition determination unit 132 determines whether the number N of pop-ups expected to be displayed is greater than a reference number M of pop-ups (S444A), can determine that the overflow condition is satisfied if the number N of pop-ups expected to be displayed is greater than the reference number M of pop-ups (Yes in S440A), and determine that the overflow condition is not satisfied if not (No in S440A).

Here, the reference number M of pop-ups may be a preset value or may be determined on the basis of an average number of IG off pop-ups which have been successfully displayed from IG off time to when the cluster is turned off (e.g., a specific point in time after the driver's door is opened).

Referring back to FIG. 4, when the current state does not correspond to the overflow condition (No in S440A), the condition determination unit 132 can determine whether the non-display condition is satisfied (S440B).

The non-display condition may mean a case in which there is a pop-up request that is likely to fail in pop-up display due to low display priority among a plurality of pop-up requests when a plurality of IG off pop-up requests is generated during a corresponding drive cycle (i.e., from IG on to IG off). Accordingly, when the non-display condition is satisfied (Yes in S440B), the condition determination unit can apply a second pop-up setting for adjusting the display time of some pop-up requests from among a plurality of pop-up requests to a time before IG off (S450B).

The pop-up recording unit 133 can store cases in which pop-ups are not normally displayed due to pop-up generation conditions or lower priorities than those of other pop-up requests as data such that the condition determination unit 132 can determine whether the non-display condition is satisfied.

For example, the pop-up recording unit 133 can record processing types according to pop-up requests and whether pop-ups are displayed for respective pop-up types, as shown in the following Table 1.

TABLE 1

| Type | Pop-up request | Pop-up display | Note |
|---|---|---|---|
| TYPE1 | ○ | ○ | Case in which a pop-up is normally displayed upon reception of a signal for pop-up request |

TABLE 1-continued

| Type | Pop-up request | Pop-up display | Note |
|---|---|---|---|
| TYPE2 | O | X | Case in which a pop-up is not normally displayed although a signal for pop-up request is received |
| TYPE3 | X | X | Case in which there is no signal for pop-up request |

That is, with respect to an arbitrary pop-up, this pop-up can be recorded as Type1 when there is a pop-up request and the pop-up is successfully displayed, recorded as Type2 when the pop-up is not displayed until cluster off after IG off due to low priority although there is a pop-up request, and recorded as Type3 when there is no pop-up request. Here, recording may mean increase in the count of each type.

According to an embodiment, the pop-up recording unit 133 may generate a list of the number of generations of Type2 for each pop-up type while recording data as shown in Table 1 or count the number of generations of Type2 for each pop-up type. Accordingly, the pop-up recording unit 133 can generate data as shown in the following Table 2.

TABLE 2

| Pop-up type | Number of generations of TYPE2 case |
|---|---|
| C | 5 |
| A | 3 |
| B | 2 |

Referring to Table 2, the number of generations of the Type2 case can be managed in the form of a list (hereinafter referred to as "non-display list" for convenience) by the pop-up recording unit 133 for three pop-up types A, B and C, and each item in the non-display list can be aligned according to the number of generations.

The condition determination unit 132 checks the non-display list in order to determine whether the non-display condition is satisfied and can determine that the non-display condition is satisfied when there is a pop-up for which the number of generations of the Type2 case is equal to or greater than a predetermined number or the number of items of the non-display list is equal to or greater than a predetermined number.

If the current state does not correspond to any of the overflow condition and the non-display condition (No in S440B), the condition determination unit 132 can maintain default setting (S450C).

Meanwhile, both the first pop-up setting (S450A) and the second pop-up setting (S450B) output pop-ups for at least some pop-up requests before IG off, but they differ from each other with respect to the following points.

First, in the first pop-up setting, as many pop-up requests as the number obtained by subtracting the reference number M of pop-ups from the number N of pop-ups expected to be displayed may be changed to pop-up requests corresponding to IG on pop-ups. Otherwise, N/2 pop-up requests when N is an even number and (N−1)/2 pop-up requests when N is an odd number may be changed to IG on pop-up requests. Here, pop-up requests changed to IG on pop-ups can be selected from a list of pop-ups expected to be displayed in order of higher items in a non-display list as shown in Table 2, but this is exemplary and the present invention is not limited thereto.

Next, in the second pop-up setting, pop-up requests for which the number of generations of the Type2 case is equal to or greater than a predetermined number may be changed to IG on pop-up requests, or when the number of items of the non-display list is equal to or greater than a predetermined number, pop-up requests corresponding to higher items exceeding the predetermined number may be changed to IG on pop-ups. Alternatively, pop-up requests corresponding to a predetermined rate (e.g., a half) of the number of all pop-up request lists in order of higher items in a non-display list may be changed to IG on pop-ups.

Upon completion of pop-up setting (S450A, S450B or S450C), when a pop-up changed to an IG on pop-up according to the setting is requested, the pop-up can be displayed (S460). Pop-up requests corresponding to the remaining IG off pop-ups can be displayed at the time of IG off (S470).

Although an IG off pop-up is displayed when the ignition is turned off (IG off) in the above-described embodiments, an IG off pop-up is not necessarily displayed immediately after the ignition is turned off according to vehicle setting. That is, IG off may be a necessary condition but not a sufficient condition for IG off pop-ups according to an embodiment. For example, at least some IG off pop-ups may be displayed after a predetermined time from IG off or at a point in time when the driver's door is opened after IG off according to implementation.

The above-described embodiments of the present invention can be realized as computer-readable code in a medium in which a program is recorded. Computer-readable media include all kinds of recording devices in which data readable by computer systems is stored. Examples of computer-readable media include a hard disk drive (HDD), a solid state drive (SSD), a silicon disk drive (SDD), a ROM, a RAM, a CD-ROM, a magnetic tape, a floppy disk, an optical data storage device, etc.

Therefore, the above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. An information output method comprising:
   determining, when a predetermined first condition is satisfied, whether at least one of a second condition or a third condition related to a pop-up in a first form displayed through a vehicle display from a time point of ignition off is satisfied; and
   setting at least one of a plurality of first pop-up requests corresponding to the pop-up in the first form to a second pop-up request corresponding to a pop-up in a second form output during ignition on when the second condition or the third condition is satisfied according to a result of the determination,
   wherein whether the second condition is satisfied is determined in consideration of a number of first pop-up requests expected at the time point of ignition off, and
   wherein whether the third condition is satisfied is determined in consideration of the number of first pop-up requests for each type which are not displayed as pop-ups in the first form after ignition off from among previously generated first pop-up requests for each type.

2. The information output method of claim 1, wherein the determining comprises:

determining the number of expected first pop-up requests based on a first pop-up request list with high generation frequency and a currently generated first pop-up request list; and determining that the second condition is satisfied when the number of expected first pop-up requests exceeds a reference number.

3. The information output method of claim 2, wherein, upon determining that the second condition is satisfied, the setting comprises:

setting as many first pop-up requests as a number obtained by subtracting the reference number from the number of expected first pop-up requests to the second pop-up requests; or setting a predetermined rate of the number of expected first pop-up requests to the second pop-up requests.

4. The information output method of claim 1, wherein the determining comprises determining that the third condition is satisfied when there is an item that is not displayed a predetermined number of times or more in a non-display list including the number of first pop-up requests for each type which are not displayed at the time point of ignition off or a number of items is equal to or greater than a predetermined number.

5. The information output method of claim 4, wherein the setting comprises determining the at least one first pop-up request set to the second pop-up request in order of higher items in the non-display list.

6. The information output method of claim 1, further comprising, after the setting:

displaying the pop-up in the second form when setting the second pop-up request; and displaying first pop-up requests other than the first pop-up request set to the second pop-up request from among the plurality of first pop-up requests from ignition off.

7. The information output method of claim 1, wherein the first condition is satisfied when a vehicle speed becomes a predetermined vehicle speed or lower after approaching or reaching a parking lot or a destination or a transmission has been changed to a parking stage.

8. The information output method of claim 1, wherein the vehicle display is provided in a cluster.

9. The information output method of claim 1, wherein the pop-up in the first form includes an ignition off pop-up and the pop-up in the second form includes an ignition on pop-up.

10. A non-transitory computer-readable recording medium storing a program for executing the information output method according to claim 1.

11. An information output apparatus for a vehicle, the apparatus comprising:

a display configured to display a pop-up in a first form from a time point of ignition off; and a controller configured to control the display, wherein the controller comprises:

a parking determination unit configured to determine whether a predetermined first condition is satisfied; and a condition determination unit configured to determine whether at least one of a second condition or a third condition related to the pop-up in the first form is satisfied when the parking determination unit determines that the first condition is satisfied and to set at least one of a plurality of first pop-up requests corresponding to the pop-up in the first form to a second pop-up request corresponding to a pop-up in a second form output during ignition on when the second condition or the third condition is satisfied, wherein whether the second condition is satisfied is determined in consideration of a number of first pop-up requests expected at the time point of ignition off, and whether the third condition is satisfied is determined in consideration of the number of first pop-up requests for each type which are not displayed as pop-ups in the first form after ignition off from among previously generated first pop-up requests for each type.

12. The apparatus of claim 11, wherein the condition determination unit is configured to determine the number of expected first pop-up requests based on a first pop-up request list with high generation frequency and a currently generated first pop-up request list and to determine that the second condition is satisfied when the number of expected first pop-up requests exceeds a reference number.

13. The apparatus of claim 12, wherein the condition determination unit is configured to set as many first pop-up requests as a number obtained by subtracting the reference number from the number of expected first pop-up requests to the second pop-up requests or to set a predetermined rate of the number of expected first pop-up requests to the second pop-up requests upon determining that the second condition is satisfied.

14. The apparatus of claim 11, wherein the condition determination unit is configured to determine that the third condition is satisfied when there is an item that is not displayed a predetermined number of times or more in a non-display list including a number of first pop-up requests for each type which are not displayed at the time point of ignition off or a number of items is equal to or greater than a predetermined number.

15. The apparatus of claim 14, wherein the condition determination unit is configured to determine the at least one first pop-up request set to the second pop-up request in order of higher items in the non-display list.

16. The apparatus of claim 11, wherein the controller is configured to cause the pop-up in the second form to be displayed when setting the second pop-up request and causes first pop-up requests other than the first pop-up request set to the second pop-up request from among the plurality of first pop-up requests to be displayed from ignition off.

17. The apparatus of claim 11, wherein the parking determination unit is configured to determine that the first condition is satisfied when a vehicle speed becomes a predetermined vehicle speed or lower after approaching or reaching a parking lot or a destination or a transmission has been changed to a parking stage.

18. The apparatus of claim 11, wherein the apparatus includes a cluster.

19. The apparatus of claim 11, wherein the pop-up in the first form includes an ignition off pop-up and the pop-up in the second form includes an ignition on pop-up.

* * * * *